United States Patent
Li et al.

(10) Patent No.: US 10,836,144 B2
(45) Date of Patent: Nov. 17, 2020

(54) SELF-HEALING GLASS PANEL

(71) Applicant: Ford Global Technologies, LLC, Dearborn, MI (US)

(72) Inventors: Yali Li, Saline, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 297 days.

(21) Appl. No.: 15/874,975

(22) Filed: Jan. 19, 2018

(65) Prior Publication Data
US 2019/0224949 A1   Jul. 25, 2019

(51) Int. Cl.
| | | |
|---|---|---|
| *B29C 65/02* | (2006.01) | |
| *B32B 17/10* | (2006.01) | |
| *B29C 70/70* | (2006.01) | |
| *B29C 70/74* | (2006.01) | |
| *B29C 70/68* | (2006.01) | |

(52) U.S. Cl.
CPC ........ *B32B 17/10963* (2013.01); *B29C 65/02* (2013.01); *B29C 70/683* (2013.01); *B29C 70/70* (2013.01); *B29C 70/745* (2013.01); *B32B 17/10036* (2013.01); *B32B 17/10064* (2013.01); *B32B 2305/72* (2013.01); *B32B 2307/762* (2013.01); *B32B 2605/006* (2013.01)

(58) Field of Classification Search
None
See application file for complete search history.

(56) References Cited

U.S. PATENT DOCUMENTS

| | | | |
|---|---|---|---|
| 4,218,500 A | 8/1980 | Radisch | |
| 4,232,080 A | 11/1980 | Orain et al. | |
| 4,584,229 A | 4/1986 | Bourelier et al. | |
| 4,643,944 A | 2/1987 | Agethen et al. | |
| 8,268,104 B1 | 9/2012 | Campfield | |
| 2011/0003137 A1* | 1/2011 | Cosentino | B32B 7/12 428/321.5 |
| 2012/0251835 A1* | 10/2012 | Dry | B29C 73/22 428/454 |
| 2015/0159316 A1* | 6/2015 | Mao | C08J 5/043 442/173 |

FOREIGN PATENT DOCUMENTS

KR   20130034714 A   4/2013

OTHER PUBLICATIONS

BBC News. (2012). Time to heal: The materials that repair themselves. Retrieved from: http://www.bbc.com/news/science-environment-19781862.
Apple Glass. (2014). Seven auto glass advances that will change the way you drive. Retrieved from: http://appleglasscompany.com/seven-auto-glass-advances-that-will-change-the-way-you-drive/.

\* cited by examiner

*Primary Examiner* — Edmund H Lee
(74) *Attorney, Agent, or Firm* — David Coppiellie; Carlson, Gaskey & Olds, P.C.

(57) ABSTRACT

A self-healing glass panel includes first and second glass layers, a reservoir between the first and second glass layers, and a liquid healing agent for healing the first or second glass layers if a crack occurs. The liquid healing agent is entrapped in the reservoir by at least one of the first or second glass layers.

15 Claims, 1 Drawing Sheet

SELF-HEALING GLASS PANEL

BACKGROUND

Multi-layer glass panels, such as automotive windshields, can be designed with self-healing features that partially or completely heal cracking. For example, capsules that contain a healing agent are embedded in an adhesive layer between glass layers in the panel or within the glass layers. Upon rupture of the capsules, the healing agent is released and flows to the damaged region to bond the cracks. Such an approach requires considerable force to "crack" the capsules open, which is generally at odds with the desire to avoid cracking of the adhesive layer in which the capsules reside. In addition, the fabrication of the glass layers with capsules requires a new and unknown manufacture method, which makes the approach of embedding healing agent in the glass layers impractical.

SUMMARY

A self-healing glass panel according to an example of the present disclosure includes first and second glass layers, a reservoir between the first and second glass layers, and a liquid healing agent for healing the first or second glass layers if a crack occurs. The liquid healing agent is entrapped in the reservoir by at least one of the first or second glass layers.

Another example self-healing glass panel according to an example of the present disclosure includes first and second glass layers, a polymer interlayer sandwiched between the first and second glass layers, and a liquid healing agent for healing the first or second glass layers if a crack occurs. The polymer interlayer defines reservoirs therein and the liquid healing agent is disposed in the reservoirs. At least one of the first or second glass layers contains the liquid healing agent in the reservoirs.

An example method of fabricating a self-healing glass panel according to the present disclosure includes depositing a liquid healing agent into reservoirs defined in a polymer interlayer, causing the liquid healing agent to solidify in the reservoirs, sandwiching polymer interlayer with the solidified healing agent between first and second glass layers, and, after the sandwiching, causing the solidified healing agent to liquefy. The liquid healing agent is contained in the reservoirs by at least one of the first or second glass layers.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
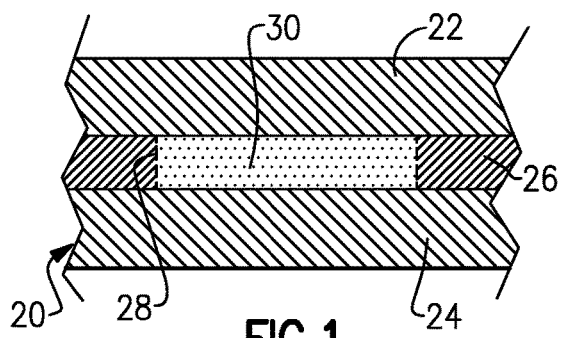
FIG. 1 illustrates an example of a self-healing glass panel that has a reservoir between the glass layers and a liquid healing agent entrapped in the reservoir by the glass layers.

FIG. 1 schematically illustrates representative portions of an example self-healing glass panel 20 (hereafter "panel 20"). As an example, the panel 20 may be a windshield or window in an automobile. It is to be appreciated, however, that the examples herein are not limited to automobiles and may also benefit other applications such as architectural uses.

The panel 20 includes a first glass layer 22 and a second glass layer 24. The glass layers 22/24 are generally spaced-apart such that there is an intermediate region there between. In this example, there is an interlayer 26 sandwiched between the glass layers 22/24. The interlayer may be an adhesive that serves to bond the glass layers 22/24 together, however, the interlayer is not limited to adhesive layers. In the example of a windshield, each of the glass layers 22/24 can be thicker than the interlayer 26. In one non-limiting example, each of the glass layers 22/24 is at least 3× thicker than the interlayer 26. In one further example, each of the glass layers 22/24 has a thickness of 2.5 millimeters or less.

There is at least one reservoir 28 between the glass layers 22/24 and a liquid healing agent 30 disposed in the reservoir 28 for healing the glass layers 22/24 should cracking occur. Although only one reservoir 28 is shown, it is to be understood that additional reservoirs can be used. The liquid healing agent 30 is entrapped in the reservoir 28 and, therefore, is generally immobilized in the panel 20. The reservoir 30, unlike a capsule, is not contained by a dedicated capsule casing. Rather, at least one of the glass panels 22 or 24 serves to contain the liquid healing agent 30 in the reservoir 28. For instance, as shown, the reservoir 28 opens on its opposed sides to the respective glass layers 22/24, and both glass layers 22/24 thus serve to entrap the liquid healing agent 30 in the reservoir 28. In other words, the glass layers 22/24 serve as boundaries that seal and retain the liquid healing agent 30 in the reservoir 28. The reservoir 28 may be defined on one or more of its lateral sides by the interlayer 26 or other wall structure that is capable of retaining the liquid healing agent 30.

Upon the occurrence of a crack near the reservoir 28, the liquid healing agent 30 flows to the crack and bonds the crack to thereby provide a "healing" effect. For example, the liquid healing agent 30 flows by capillary action into the crack. In this regard, multiple reservoirs 28 may be provided in a spaced relationship such that wherever a crack occurs in the panel 20, there is a reservoir 28 nearby to reduce the distance that the liquid healing agent 30 must flow to reach the crack. As an example, the spacing between the reservoirs 28 may be 0.1 millimeters to 5 millimeters. In one further example, the spacing is about 1 millimeter.

Although not bounded by any particular theory, the mechanism of bonding between the liquid healing agent 30 and the sides of the crack may be via Van der Waals forces. This provides high surface tension in the liquid healing agent 30 at both sides of the crack, thereby enabling the liquid healing agent 30 to act as an adhesive. The liquid healing agent 30 may also cure (i.e., solidify by chemical cross-linking) in the crack, such as upon exposure to air, moisture, or both.

Figure 2:
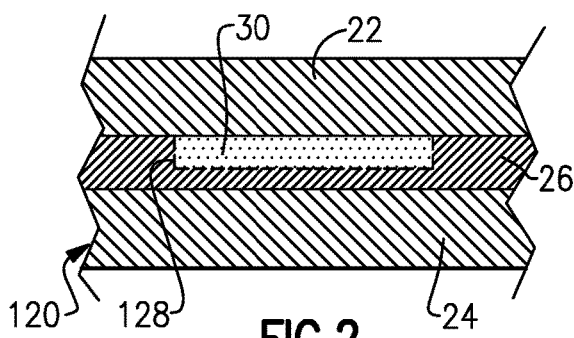
FIG. 2 illustrates an example of a self-healing glass panel that has a reservoir between the glass layers and a liquid healing agent entrapped in the reservoir by one of the glass layers.

FIG. 2 illustrates another example self-healing glass panel 120. In this disclosure, like reference numerals designate like elements where appropriate and reference numerals with the addition of one-hundred or multiples thereof designate modified elements that are understood to incorporate the same features and benefits of the corresponding elements unless specified otherwise. Here, the reservoir 128 opens to the first glass layer 22 but not the second glass layer 24. That is, the reservoir 128 does not extend entirely through the interlayer 26. As a result, the first glass layer 22 serves to entrap and contain the liquid healing agent 30 in the reservoir 128, while the second glass layer 24 does not. In other words, of the glass layers 22/24, only the glass first layer 22 in this example serves as a boundary that seals and retains the liquid healing agent 30 in the reservoir 128. The reservoirs 128 can thus provide healing to the first glass layer 22. Additional reservoirs 128 could be provided on the other side of the interlayer 26 that open to the second glass layer 24 but not the first glass layer 22, to provide healing to the second glass layer 24.

In further examples, the reservoirs 28/128 are of regular geometry, such as but not limited to, cylindrical, rectangular prism, and triangular prism. Additionally, the reservoirs 28/128 may generally be of a maximum dimension of about 0.1 millimeters to about 5 millimeters (e.g., for a cylinder shape, the dimension would be the diameter). The size of the reservoirs 28/128 can be varied within the above range, or outside of that range if more or less of the liquid healing agent 30 is desired. In a further example, the reservoirs 28/128 are micro-reservoirs and thus have a maximum dimension of about 0.1 micrometers to 500 micrometers. In additional examples, the minimum spacing between adjacent reservoirs 28/128 is less than the maximum dimension of the reservoirs 28/128, to increase packing density of the reservoirs in the panel 20/120.

In further examples, and especially if used for windows or windshields, the panels 20/120 are optically transparent. In this regard, the liquid healing agent 30 is also optically transparent. In a further example, to enhance optics, the glass layers 22/24 and the liquid healing agent 30 have substantially equivalent indices of refraction. For instance, the index of refraction of the liquid healing agent 30 is within 10% of the index of refraction of the glass layers 22/24.

In general, the liquid healing agent 30 should be optically clear, good as a bonding/healing agent, resistant to ultraviolet degradation, thermally stable, chemically inert with respect to the glass layers 22/24 and other materials that may be in the panel 20/120, and resistant to other environmental factors that may be particular to the end use.

In one example, the liquid healing agent 30 is liquid over a temperature range of −40° F. to 200° F. In most applications the panel 20/120 will not be exposed to temperatures outside of this range, and the liquid healing agent 30 will thus remain as a liquid throughout use of the panel 20/120.

In further examples, the liquid healing agent 30 is a silicone- or epoxy-based polymer. As used herein, "-based" refers to the composition of the liquid healing agent 30 having silicone or epoxy polymer in a greater amount than any other constituent in the composition. Further examples of the liquid healing agent 30 may include, but are not limited to, one-component epoxies. Example commercial products may include silicone glass sealers known as DEVCON® by ITW Polymers Adhesives, Loctite 37613, and 1600 CPS or 2400 CPS of Ultra Bond. Some liquid healing agents 30 may need to be cured with moisture in the air, which can be achieved by spaying the water to the glass panel, for example, the water can be from the windshield washer nozzle for the windshield application.

Figure 3:
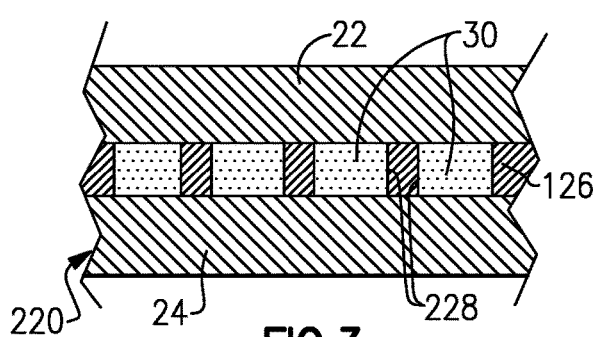
FIG. 3 illustrates an example of a self-healing glass panel that has reservoirs defined in a polymer interlayer between the glass layers and a liquid healing agent contained in the reservoirs by the glass layers.

FIG. 3 illustrates another example self-healing glass panel 220. In this example, there is a polymer interlayer 126 sandwiched between the glass layers 22/24. For instance, the polymer interlayer 126 is an adhesive layer, such as poly vinyl butryal (PVB), which bonds the glass panels 22/24 together. The polymer interlayer 126 also defines reservoirs 228 and the liquid healing agent 30 is disposed in the reservoirs 228. The reservoirs 228 in this example are through-holes in the polymer interlayer 126 and are thus open to both glass layers 22/24. In this regard, both glass layers 22/24 serve to entrap and contain the liquid healing agent 30 in the reservoirs 228.

Figure 4:
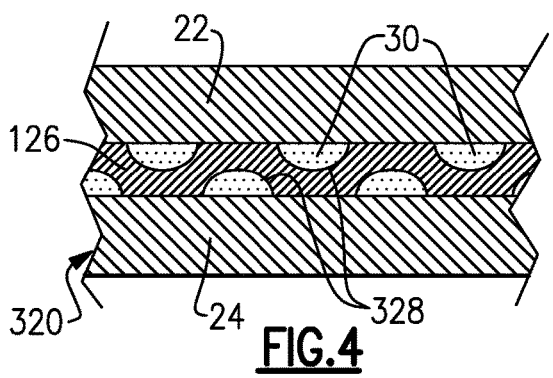
FIG. 4 illustrates an example of a self-healing glass panel that has reservoirs defined in a polymer interlayer between the glass layers and a liquid healing agent contained in the reservoirs by the glass layers.

FIG. 4 illustrates another example self-healing glass panel 320. In this example, the reservoirs 328 are dimples in the polymer interlayer 126 and the liquid healing agent 30 is disposed in the dimples. The dimples are provided on both sides of the polymer interlayer 126 such that the dimples on the top open to the first glass layer 22 but not the second glass layer 24 and the dimples on the bottom open to the second glass layer 24 but not the first glass layer 22. In this regard, the first glass layer 22 serves to contain the liquid healing agent 30 in the reservoirs 328 on the top while the second glass layer 24 serves to contain the liquid healing agent 30 in the reservoirs 328 on the bottom. The dimples on the top can thus provide healing to the first glass layer 22 and the dimples on the bottom can provide healing to the second glass layer 24. The patterns of the dimples can be identical, but laterally offset, such that the dimples on the top are misaligned with the simples on the bottom. This ensures that there is a proper amount of the polymer interlayer 126 for bonding, whereas if dimples were aligned there would only be a thin amount of the interlayer 126 between the apexes of the dimples.

Figure 5:
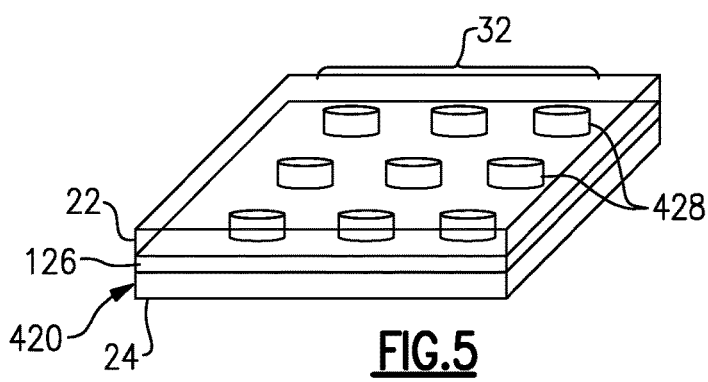
FIG. 5 illustrates a self-healing glass panel that has a pattern of reservoirs.

FIG. 5 illustrates a further example of a self-healing glass panel 420. In this example, the reservoirs 428 are arranged in a pattern 32. As used herein, a "pattern" is an arrangement that has a repeating formation of the reservoirs 428. For instance, the pattern 32 may be repeated rows of reservoirs or repeated "units" of two or more reservoirs in a spaced relationship.

Figure 6:
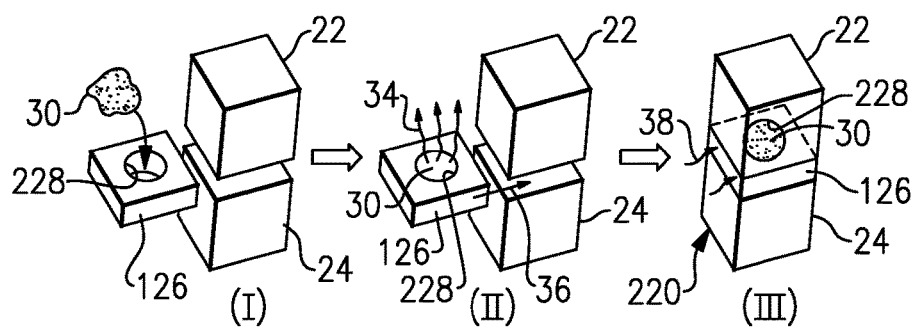
FIG. 6 illustrates a method of fabricating a self-healing glass panel.

FIG. 6 depicts an example method of fabricating the self-healing glass panel 220, although it is to be understood that the method may also be applied to fabricate the other example panels described herein. FIG. 6 depicts three progressions I, II, and III. In progression I the liquid healing agent 30 is deposited into the reservoirs 228 in the polymer interlayer 126. For instance, the deposition may include, but is not limited to, pouring the liquid healing agent 30 or injecting the liquid healing agent 30 from a manual or automated dispenser. As will be appreciated, for examples in which the reservoirs are through-holes, the interlayer may be provided on a carrier or on the second glass layer 24 to prevent the liquid healing agent 30 from running out of the bottom of the reservoir.

Following the deposition, in progression II the liquid healing agent 30 is caused to immobilize in the reservoirs 228. For instance, as represented at 34, the temperature of the liquid healing agent 30 is decreased to immobilize the healing agent 30. A reduction in temperature may be used to increase viscosity of the liquid healing agent 30, thereby immobilizing the healing agent 30 in the reservoirs 28. In a further example, depending on the temperature reduction and the type of healing agent 30, the healing agent may freeze to immobilize.

Once immobilized, the polymer interlayer 126 is sandwiched between the glass layers 22/24, as represented at 36. This may include moving the polymer interlayer 126 onto the second glass layer 24 (if not already on the second glass layer 24 from the deposition step) and then moving the first glass layer 22 onto the polymer interlayer 126.

After the sandwiching, the solidified healing agent 30 is caused to mobilize. For instance, as represented at 38, the temperature of the solidified healing agent 30 is increased to decrease the viscosity of, or melt, the healing agent 30. The temperature increase may also cause the polymer interlayer 126 to bond with the glass layers 22/24. The liquid healing agent 30 is thereby contained and sealed in the reservoirs 128 by the glass layers 22/24.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A self-healing glass panel comprising:
first and second glass layers;
a reservoir between the first and second glass layers; and
a liquid healing agent for healing the first or second glass layers if a crack occurs, wherein the reservoir opens to both the first and second glass layers and the liquid healing agent is entrapped in the reservoir by the first and second glass layers.

2. The self-healing glass panel as recited in claim 1, wherein the liquid healing agent is liquid over a temperature range of −40° F. to 200° F.

3. The self-healing glass panel as recited in claim 1, wherein the liquid self-healing agent is silicone-based or epoxy-based.

4. The self-healing glass panel as recited in claim 1, wherein the reservoir is a micro-reservoir.

5. The self-healing glass panel as recited in claim 1, wherein the first and second glass layers and the liquid healing agent have substantially equivalent indices of refraction.

6. The self-healing glass panel as recited in claim 1, wherein the liquid healing agent is curable upon exposure to moisture.

7. A self-healing glass panel comprising:
first and second glass layers;
a polymer interlayer sandwiched between the first and second glass layers, the polymer interlayer defining reservoirs therein, wherein the reservoir includes at least one of through-holes in the polymer interlayer or dimples in the polymer interlayer; and
a liquid healing agent for healing at least one of the first or second glass layers if a crack occurs, the liquid healing agent being disposed in the reservoirs and contained in the reservoirs by at least one of the first or second glass layers.

8. The self-healing glass panel as recited in claim 7, wherein the reservoir includes the dimples, and the polymer interlayer and the first glass layer exclusively contain the liquid healing agent in the dimples.

9. The self-healing glass panel as recited in claim 7, wherein the reservoir includes the through-holes, and the polymer interlayer and the first and second glass layers exclusively contain the liquid healing agent in the through-holes.

10. The self-healing glass panel as recited in claim 7, wherein the reservoir include the dimple, the polymer interlayer has top and bottom sides, and the dimples are on both the top and bottom sides.

11. The self-healing glass panel as recited in claim 7, wherein the reservoirs are arranged in a pattern.

12. The self-healing glass panel as recited in claim 7, wherein the reservoirs are micro-reservoirs.

13. The self-healing glass panel as recited in claim 7, wherein the liquid self-healing agent is silicone-based or epoxy-based.

14. A method of fabricating a self-healing glass panel, the method comprising:
depositing a liquid healing agent into reservoirs defined in a polymer interlayer, wherein the reservoirs include at least one of through-holes in the polymer interlayer or dimples in the polymer interlayer;
causing the liquid healing agent to immobilize in the reservoirs;
sandwiching polymer interlayer with the immobilized healing agent between first and second glass layers; and
after the sandwiching, causing the immobilized healing agent to mobilize, wherein the liquid healing agent is then contained in the reservoirs by at least one of the first or second glass layers.

15. The method as recited in claim 14, wherein a reduction in temperature is used to cause the liquid healing agent to immobilize in the reservoirs, and an increase in temperature is used to cause the solidified healing agent to mobilize.

* * * * *